US008189966B2

(12) United States Patent
Peev et al.

(10) Patent No.: US 8,189,966 B2
(45) Date of Patent: May 29, 2012

(54) QKD ARRANGEMENT

(75) Inventors: Momtchil Peev, Vienna (AT); Stefano Bettelli, Vienna (AT)

(73) Assignee: Austrian Research Centers GmbH-ARC, Vienna (AT)

(*) Notice: Subject to any disclaimer, the term of this patent is extended or adjusted under 35 U.S.C. 154(b) by 839 days.

(21) Appl. No.: 12/267,150

(22) Filed: Nov. 7, 2008

(65) Prior Publication Data
US 2009/0190759 A1   Jul. 30, 2009

(30) Foreign Application Priority Data
Nov. 7, 2007   (AT) .................. A 1795/2007

(51) Int. Cl.
G02B 6/26       (2006.01)
G02B 6/00       (2006.01)
H04L 9/08       (2006.01)

(52) U.S. Cl. ............... 385/11; 385/14; 385/39; 385/88; 380/256; 380/278

(58) Field of Classification Search .................. None
See application file for complete search history.

(56) References Cited

U.S. PATENT DOCUMENTS

| 5,307,410 | A  | * | 4/1994  | Bennett ................ | 380/256 |
| 5,675,648 | A  | * | 10/1997 | Townsend ............. | 380/278 |
| 5,764,765 | A  | * | 6/1998  | Phoenix et al. ........ | 380/283 |
| 6,028,935 | A  | * | 2/2000  | Rarity et al. .......... | 380/256 |
| 6,314,189 | B1 | * | 11/2001 | Motoyoshi et al. .... | 380/278 |
| 7,831,048 | B2 | * | 11/2010 | Kastella et al. ........ | 380/256 |
| 2005/0190922 | A1 | * | 9/2005  | LaGasse .............. | 380/278 |
| 2010/0290626 | A1 | * | 11/2010 | Jenkins et al. ......... | 380/278 |
| 2011/0013906 | A1 | * | 1/2011  | Stevenson et al. ..... | 398/25 |

FOREIGN PATENT DOCUMENTS

WO    WO 2005/060139    6/2005

OTHER PUBLICATIONS

L. Ma et al. Detection-time-bin-shift schemes for polarization encoding quantum key distribution system. Proc. of SPIE vol. 7092, 709206-1-10, Sep. 2008.*
Bettelli et al., Effect of double pair emission to entanglement based QKD, CLEO-Europe, '07 IQEC, Jun. 21, 2007.
Dušek et al., "Quantum cryptography," In: *Progress Optics*, 49: Chapter 5, Edt. E. Wolf, 2006.
Gisin et al., "Quantum cryptography," *Rev. Mod. Phys.*, 74:145, 2002.
Poppe et al., "Practical quantum key distribution with polarization entangled photons," *Optics Express*, 12: 3865-3871, 2004.

* cited by examiner

*Primary Examiner* — Mike Stahl
(74) *Attorney, Agent, or Firm* — Fulbright & Jaworski L.L.P.

(57) ABSTRACT

A QKD arrangement with a photon source generating entangled idler and signal photons, with two measuring units, one of which receiving the idler photons and the other one receiving the signal photons, and each including an optical module with photon channels, wherein a photon passes a photon channel as a function of its polarization, and a device for detecting the photons in association to its respective photon channel, as well as a time control for timingly adjusting the detection devices; the photon source is adapted for pulsed emission of photon pairs, and an interrupting unit supplying the signal photons to the optical module in pulsed manner is arranged upstream of the other measuring unit, the photon channels in each optical module including delay units with different delay periods, and only one single-photon detector associates the photons to the photon channels on the basis of a time pattern.

15 Claims, 3 Drawing Sheets

QKD ARRANGEMENT

FIELD OF THE INVENTION

The invention relates to a QKD arrangement comprising a photon source adapted for generating pairs of entangled photons, i.e. idler photons and signal photons, and further comprising two measuring units, the idler photons of said photon pairs being supplied to one of the measuring units and the signal photons of said photon pairs being supplied to the other one of the measuring units; each of said measuring units comprises an optical module with several photon channels, one photon passing only one of these photon channels as a function of its polarization, and a detection device for detecting such a photon in association with the respective photon channel, as well as a time controller for timingly adjusting the detecting devices of the two measuring units with a view to the correlated detection of the photons of each pair.

BACKGROUND OF THE INVENTION

First, it is to be stated that photons do not have any defined polarization, except if their state is an eigenstate of the polarization measuring device, and that the value of the polarization is only determined by the measurement. In the present description, the term "as a function of its polarization" is to be understood accordingly.

By "QKD"—"quantum key distribution" (sometimes, though not quite correctly, also termed "quantum cryptography") quite generally denotes a communication protocol between two subscribers which allows for the generation of a secret, mutual key by using a classical authentic public channel and a quantum channel. In (quantum) cryptography, the two legitimate subscribers usually are called "ALICE" and "BOB", whereas a possible eavesdropper is called "EVE" (from "eavesdropper").

In detail, "quantum cryptography" denotes the technique of generating and distributing symmetric secrets, wherein the secrets, i.e. identical bit sequences issued at two spaced-apart locations, can be detected with mathematical exactness by means of methods of quantum information theory (information-theoretical security). Subsequently, the created and distributed symmetrical secrets may be used, e.g., as the key for symmetric cryptographic coding methods. On the contrary, for conventional key distribution systems based on asymmetric cryptography there exists no such proof of security.

Quantum cryptography has been interdisciplinarily developed between the scientific fields of quantum physics, quantum optics, information theory, cryptography and informatics. A survey of the bases and methods as well as the historical development of quantum cryptography is contained in the articles by N. Gisin, G. Ribordy, W. Tittel and H. Zbinden, "Quantum Cryptography", Rev. Mod. Phys. 74, 145 (2002); and by M. Dušek, N. Lütkenhaus, M. Hendrych, "Quantum Cryptography", chapter 5, Progress in Optics, vol. 49, Edt. E. Wolf (Elsevier, 2006).

A conventional quantum-cryptographic link comprises two stations, or apparatuses, respectively, usually denoted ALICE component and BOB component. These two stations set up at spaced-apart locations are connected by an optical quantum channel (fiberglass-bound or through free space) as well as by a conventional, classical communication channel, also termed public channel.

In its ALICE and BOB components, such a quantum-cryptographic link generates symmetric secrets (i.e. secrets identical in the ALICE and BOB components) which are delivered to the outside via data channels for further use, e.g. as a key in connected cryptographic systems.

In the following, only QKD will be considered which is based on entangled photons. In this case, two entangled photons which have correlated properties are sent to the two partners. The two partners measure these properties, such as, e.g. the polarization, obtain the same measurement results, and therefore can generate an identical key. Parts of the measurement results, such as, e.g., the exact points of time, are exchanged via public channels. All the messages which are exchanged via public channels must be authenticated. In this manner, the two partners are capable of exactly associating the individual measurements to each other.

In the method of entangled photons, two photons which are quantum-mechanically correlated, can be generated simultaneously in a photon source by a special technique. One photon each, i.e. the idler photon, on the one hand, and the signal photon, on the other hand, is sent to one of the two partners so that the two partners will simultaneously (apart from the line delays) receive a basically identical measurement result. By the subsequent authenticated communication, the same key will be generated at both partners via the public channel.

In the past, various QKD protocols have been suggested with a view to different photon sources. One of the best known and most frequently used protocols is the so-called "BB84-protocol" (BB84—Bennet-Brassard 1984); with the appropriate devices, it can be ensured with this BB84 protocol that a secure quantum key distribution will occur, or that a possible eavesdropper will certainly be detected.

At the BB84 protocol, in the preferred version of interest here, in which the entangled photons are used, photons are each generated by the photon source in pairs with the corresponding, entangled polarization. The photon source comprises, e.g., a pump laser and a non-linear crystal for spontaneous parametric down conversion (SPDC), wherein the photon pairs comprise a local photon, the idler or trigger photon used for triggering the transmission of a signal, and the signal photon or "remote" photon used for information transmission on the quantum channel to the remote subscriber.

FIG. 1 shows the principle of a prior art QKD arrangement 1 (cf. also Poppe et al., "Practical Quantum Key Distribution with Polarization-Entangled Photons", Opt. Express, 12:3865-3871). This known QKD arrangement 1 comprises a photon source 2 with a pump laser 3 and an SPDC crystal 4 for generating polarization-entangled photons, i.e. specifically signal photons, for the transmission on a quantum channel 5 to a party "BOB", as well as idler photons for the local party "ALICE". The two parties or subscribers ALICE and BOB are denoted by 6 and 7, respectively, in FIG. 1. The photon source 2 generates pairs of photons e.g. at a rate of 1 MHz, with an entanglement contrast of >96%.

For measuring the respective photons, a measuring unit 8 and 9, respectively, is provided at each subscriber 6 and 7, respectively, which each have an optical module 10 as well as a number of single photon detectors in the form of photodiodes, e.g. avalanche photodiodes, as a detection device 11. In optical modules 10 of similar design, four photon channels 12, 13, 14, 15 are each provided, which each define an output of the optical module 10, to which an associated single photon detector is connected. The four photon channels 12, 13, 14, 15 are obtained in that polarizing beam splitters 17, 18 are connected to the two light outputs of a non-polarizing beam splitter 16 downstream thereof, a half-wave platelet (λ/2-platelet) 19 being arranged upstream of one of these polarizing beam splitters, e.g. the beam splitter 17. The individual photon channels 12 to 15 then each follow the polarizing beam splitter 17, 18 in the passage path or reflexion path, respectively. Accordingly, the photon channels 12 to 15 can only be passed by photons with horizontal or vertical polarization, respectively, the λ/2 platelet having the additional effect that the photons which pass within the photon channel 12 or 13 have a +45° polarization plane and a −45° polarization plane.

If an idler photon at the local subscriber side 6 "ALICE" is supplied to the optical module 10, it will reach one of the four individual photon detectors which are to be considered as "numbered" (cf. the numbers "1" to "4") via one of the four photon channels 12 to 15, and depending on the number of the reacting single photon detector of the detection device 11, a measurement result, one bit, will be obtained which can be used for the BB84 protocol.

If the measuring unit 9 with the optical module 10 and the single photon detectors of the detection device 11 is accordingly designed, a corresponding sequence will occur on the remote subscriber side 7 "BOB", even though, due to the transmission via the quantum channel 5 (in FIG. 1 also an optical guide fiber 5' is schematically illustrated), a delay of the respective signal photon of a pair relative to the idler photon will exist at the ALICE side 6. Accordingly, a trigger electronic is i.a. provided as time controller 20 so as to send trigger pulses to the remote subscriber 7 as soon as a photon is detected at the local subscriber 6. These trigger signals are transmitted via an independent line.

One disadvantage of this known QKD arrangement is that always several, in particular four, individual photon detectors must be used which practically can never be completely identical so that they will not yield reliably alike results, entailing security risks. Moreover, it is disadvantageous that the single photon detectors which as such are comparatively expensive must be provided in relatively large numbers (2×4 single photon detectors in the example illustrated). During operation, also all the single photon detectors of one subscriber have to be switched off after a detection, such as for periods of at least 50-60 ns, which also has negative effects during operation. In addition, also the trigger electronic in the time controller 20 involves relatively high expenditures.

In another known arrangement (cf. Bettelli et al., "Effect of double pair emission to entanglement based QKD", CLEO-Europe '07 IQEC, 21 Jun. 2007), a 532 nm CW-laser is used as the pump laser in combination with a non-linear SPDC-crystal so as to obtain non-degenerated pairs of photons. Values typically achieved for the photon rates here are about 2 MHz, at a pump output of 16 mW. The idler photons and signal photons have a mean wavelength of 810 nm and 1550 nm, respectively. In this case, silicon phododiodes can be used as single photon detectors at one local subscriber side (ALICE), similar as with the original version, yet on the side of the remote subscriber (BOB) it is then necessary to use InGaAs detectors for the detection device because of the different frequency range. These InGaAs detectors additionally increase expenses.

SUMMARY OF THE INVENTION

It is now an object of the invention to provide a QKD arrangement of the initially defined type, which remedies the aforementioned disadvantages as far as possible and allows the arrangement to be of a simpler design and also to work better. In particular, a reduction in costs is to be achieved, particularly if the last-mentioned photon source is used, in which the pair-wise photons are generated with different wavelengths.

To achieve this object, the invention, according to an embodiment, provides a QKD arrangement comprising a photon source adapted for generating pairs of entangled photons, i.e. idler photons and signal photons, and two measuring units one of which receives the idler photons and the other one receives the signal photons of the photon pairs, each of which measuring units has an optical module with several photon channels, wherein one photon passes only one of these photon channels as a function of its polarization, and a detection device for detecting one such photon in association to its respective photon channel, as well as a time controller for timingly adjusting the detection devices of the two measuring units with a view to the correlated detection of the photons of each pair; the photon source is adapted for pulse-wise emitting the photon pairs and the other measuring unit is preceded by an interrupting unit for the corresponding pulse-wise supplying of the signal photons to the optical module, and in each optical module, the photon channels, preferably except for one, have photon delay units with predetermined different delaying periods, and just one respective single photon detector is provided as the detection device in each measuring unit, and the respective transmitted photon is associated to the respective photon channel which it has passed on the basis of a time pattern.

Advantageous further embodiments and developments are indicated in the following.

In simple terms, with the present QKD arrangement, thus, the multiple arrangement of single photon detectors (SPD) is replaced by a "time multiplex" system, wherein the delay units which, preferably, are formed by simple delaying lines (e.g. fiberglass) of different lengths, change the form of the signal such that it can reach the single photon detector of the respective detection device only within certain "time slots". Therefore, instead of the output of one of several detector elements defining the measurement signal, the measurement signal in the present circuit is determined by the respective time slot. By the pulsed operation of the photon source, in particular by including an interrupting unit, just as by arranging an interrupting unit on the remote subscriber side detecting the signal photons, appropriately large time windows are defined, and the time slots associated with the photon channels, e.g. four time slots, including the idle periods between the same, are to be accommodated within these time windows. It is advantageous in this respect that now only one single photon detector, e.g. a single photodiode, can be arranged on each subscriber side, which is a substantial advantage also with regard to the additional circuiting of the individual photon detectors as well as their operating modes with idle periods, their noise etc.; in contrast, the additional use of the interrupting units just as the delay units—which all are comparatively simple, problem-free components—is not problematic.

For measuring the respective photons, also in the present arrangement it is suitable if each optical module is equipped with two polarizing beam splitters which are arranged in the two beam passages downstream of a non-polarizing beam splitter, once with a λ/2 platelet serving as polarization-rotating device interposed, and once directly, and which, with their two times two (2×2) outputs define four photon channels. In this respect, for instance, each optical module in each photon channel contains a delay unit connected to a respective beam splitter output, yet it is also possible to have one photon channel without a delay unit and to arrange delay units in the other three photon channels. The delay units per optical module each have increasing delaying periods, which may be realized e.g. by means of differently long delaying light conducting lines.

Depending on the circumstances, the photons occurring at the respective photon channel output may either directly be fed to the respective single photon detector or via an optical coupling unit, wherein, e.g., a single 4/1 coupling unit or also a coupling unit with three 2/1 couplers in a cascade can be provided.

In the present arrangement, a simple synchronization unit is sufficient for time control purposes, which unit optionally is configured with a PLL (phase-locked loop) circuit; in that case, suitably clock signal units will be provided on the two subscriber sides so as to temporally appropriately activate the respective components, i.e. the photon source, in particular the optical interrupting unit provided therein, respectively, the single photon detector and an associated evaluating unit, on the one hand, and the interrupting unit as well as the single photon detector and an associated evaluating unit, on the other hand. These clock signal units are connected to their common synchronizing unit which takes care that the respective clock signals correspond to each other in their frequency (which does not mean that the frequencies are identical, since also definite associations of the clock signal frequencies, such as at a ratio of 2:1 etc., are conceivable); in the beginning and at certain periodical points of time, the clock signals of the two clock signal generators are temporally matched to each other, the delay of the signal photons transmitted via the quantum channel in relationship to the idler photons on the local subscriber side being taken into consideration. Such a synchronizing unit is also comparatively simple in comparison with the trigger electronic means required in the known arrangement.

BRIEF DESCRIPTION OF THE DRAWINGS

In the following, the invention will be explained in more detail by way of preferred exemplary embodiments to which, however, it shall not be limited, and with reference to the drawings. In the drawings.

DETAILED DESCRIPTION OF PREFERRED EMBODIMENTS

Figure 1:
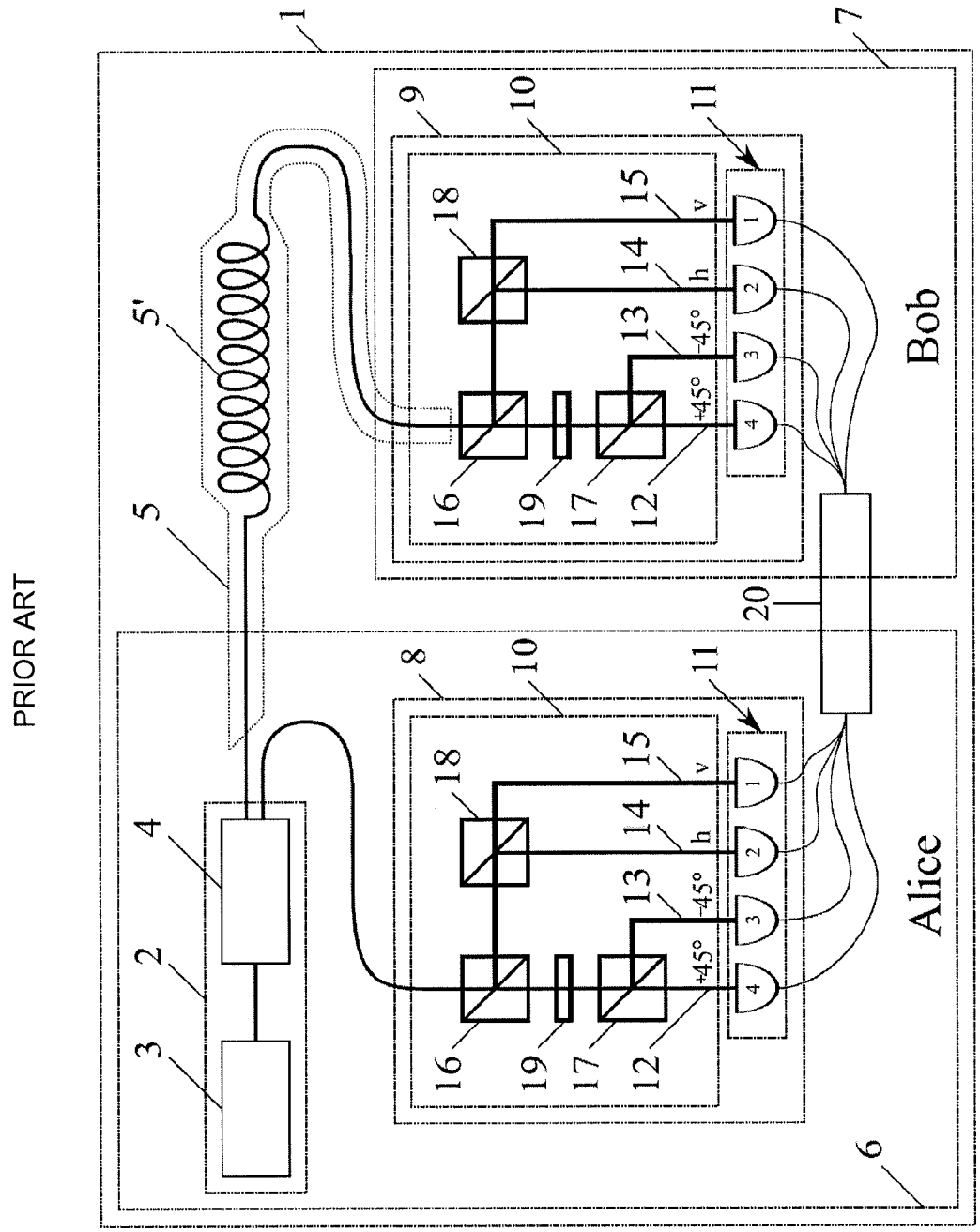
FIG. 1 shows a schematic of a conventional QKD arrangement which has already been explained in the introductory portion.
Figure 2:
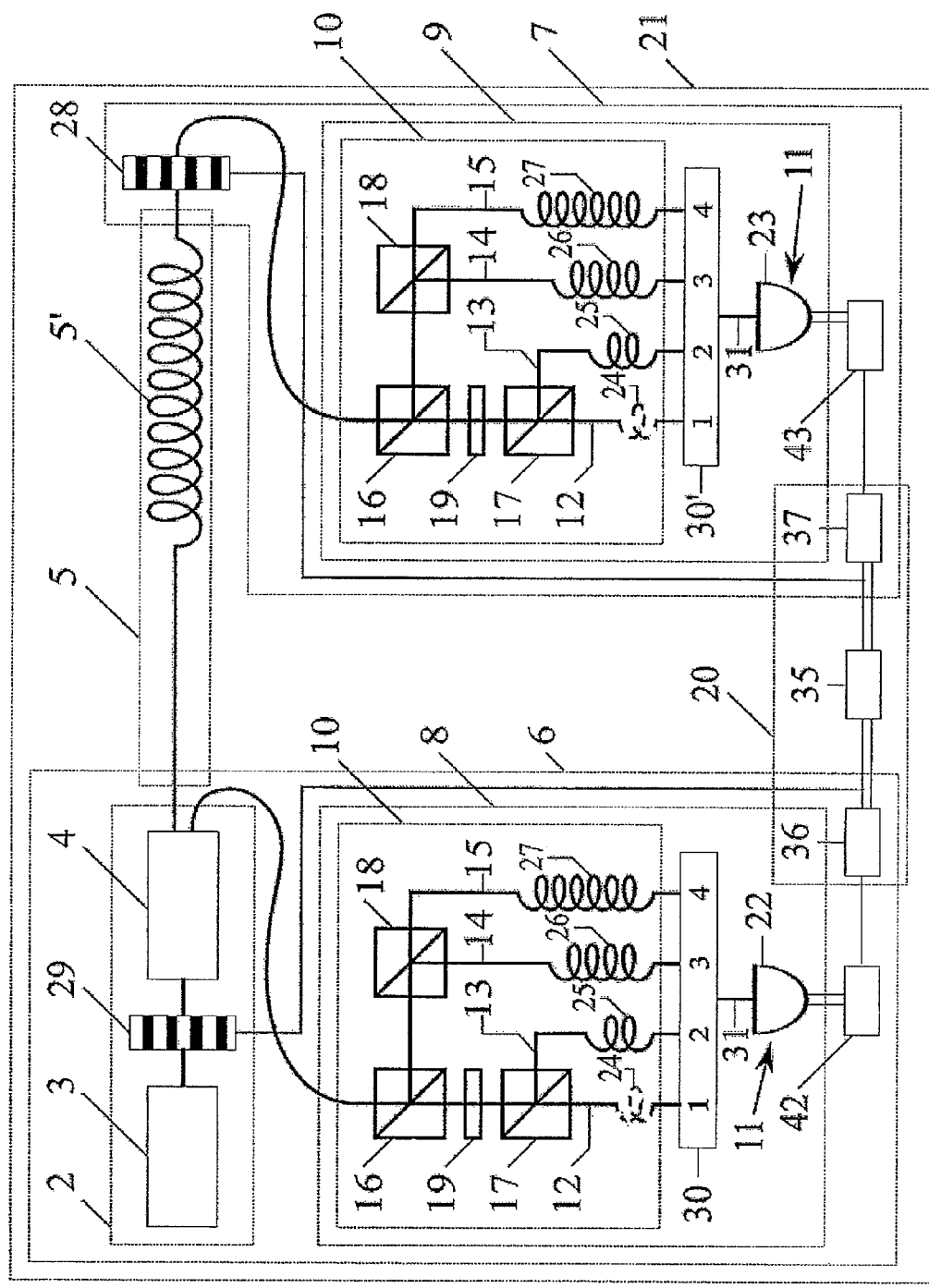
FIG. 2 shows a corresponding schematic of a QKD arrangement according to the invention.

The QKD arrangement 21 according to the invention shown in FIG. 2 in a scheme similar to that of FIG. 1 basically has a similar set-up as the known QKD arrangement 1 according to FIG. 1, and therefore corresponding components have been designated by the same reference numbers.

Thus, the QKD arrangement 21 according to FIG. 2 particularly contains a photon source 2 with a pump laser 3 and a non-linear SPDC crystal 4 so as to generate photons entangled in pairs, i.e. signal photons and idler photons. While the idler photons in the local subscriber station 6 which also contains the photon source 2 are to be measured by means of the measuring unit 8, the signal photons are fed to a remote subscriber station 7 via a quantum channel 5 with an optical guide 5' for measurement in the measuring unit 9 so as to generate a quantum key in a manner known per se which need not be explained here in more detail.

In its measuring unit 8 or 9, respectively, each subscriber station 6, 7 in turn includes an optical module 10, both optical modules 10 in principle being of a similar design so that a single explanation will suffice. Similar to FIG. 1, also in the QKD arrangement 21 according to FIG. 2, a non-polarizing beam splitter 16 is provided in each optical module 10 so as to supply the individual photons either to a first polarizing beam splitter 17—via a λ/2 platelet 19—or—directly—to a further polarizing beam splitter 18. In this way, subsequent photon channels 12, 13, 14, 15 are obtained due to the two beam splitters 17, 18, similar as in FIG. 1 always one following the passage path and one following the reflection path of the respective beam splitter 17 or 18. By means of the λ/2 platelet 19, a 45° rotation of the polarization plane is introduced again.

However, other than in the arrangement according to FIG. 1, in which each detection device 11 comprises a plurality of single photon detectors, according to FIG. 2, at each station 6 or 7, only one single photon detector is provided as detection device 11, e.g. an SPD photodiode 22 or 23, respectively, so as to detect the individual photons and thereby associate them to the respective photon channel 12, 13, 14 or 15, i.e. measure its polarization. In order to enable this association and, thus, the measurement of the photons, the photon channels 12, 13, 14, 15 are each provided with a delay unit 24, 25, 26, 27, e.g. in the form of delay lines with different, definitely pre-determined delay periods. Accordingly, the polarization of the photon is concluded in a kind of time multiplex technology on the basis of the temporal occurrence of a photon within a pre-determined time window on the respective photon channel 12, 13, 14, 15. It is also possible to omit a delay unit or delay line, respectively, in the respective optical module 10, e.g. the delay unit 24 in the "first" photon channel 12 (which, therefore, is shown with interrupted lines), in which case only the remaining three photon channels, e.g. 13, 14, 15, are equipped with delay units (with different delay periods)— what is important here is only the temporal association of the occurrence of a respective photon with a certain time slot.

The general time window within which the four time slots thus given are contained—according to the four photon channels 12 to 15, is determined by a pulsed delivery of the photons by the photon source 2, on the one hand and, on the side of the remote subscriber station 7, by the interrupting unit 28 in the form of a chopper, on the other hand.

In the photon source 2, for instance a comparable interrupting unit 29, such as a mechanical chopper, is accommodated, such as between the pump laser 3 and the crystal 4, so as to periodically interrupt the laser beam, or allow it to pass, respectively. In principle, however, it would also be possible to use a pulsed laser instead of a continuous-wave laser. In this case, there may, however, be the problem that conventionally pulsed lasers are adapted for delivering very short laser pulses, in the range of, e.g., picoseconds, which may be disadvantageous for a QKD arrangement. In particular, due to the wide frequency spreading, a polarization dispersion may occur in the quantum channel and, due to the high output of the laser pulses, an increased generation of multiple pairs may occur. Nevertheless, also suitable pulsed lasers may be used, which generate pulses which are not as rich in energy and have a longer pulse duration.

At least at present, the solution illustrated in FIG. 2, namely with the two interrupting units 28, 29 in the form of choppers, is considered to be simple and particularly advantageous, wherein by these optomechanical components, the laser beam in the photon source 2 is physically blocked for the pre-determined periods. Such choppers are known per se and consist, e.g., of a rotatable disk or of two disks rotatable in opposite directions with slots etched thereinto. These choppers are extremely reasonable in price, and commercially available choppers use a metallic plate having a thickness of <1 mm as blocking means, which is treated by conventional photoetching techniques to produce the passage slots for the laser beams. With these known choppers, repetition rates of 100 kHz (at the most) can be attained.

Instead of the mechanical choppers, integrated electrooptical amplitude modulators may be used as optoelectronic choppers if particularly high repetition rates are desired, such components also being commercially available. With the latter, repetition rates of up to 1 GHz and more are possible, and due to the lack of movable parts, they also have a particularly long useful life and are highly reliable. Such optoelectronic choppers may introduce certain transmission losses into the system, yet these losses are relatively low in the field of telecommunication wavelengths.

The photons which are to be transmitted by a respective one of the four photon channels 12, 13, 14 or 15 to the SPD photodiode 22, or 23, respectively, may be directly fed to the photodiode 22 or 23, respectively, in a light-proof housing, e.g. by respective focusing. An optical guide-dependent transmission of the photons to the photodiodes 22, 23 is, however, more advantageous, in which case a coupler unit 30 or 30' will be provided so as to combine the four photon channels 12 to 15 into one single channel 32 to the photodiode 22 and 23, respectively.

Figure 3:
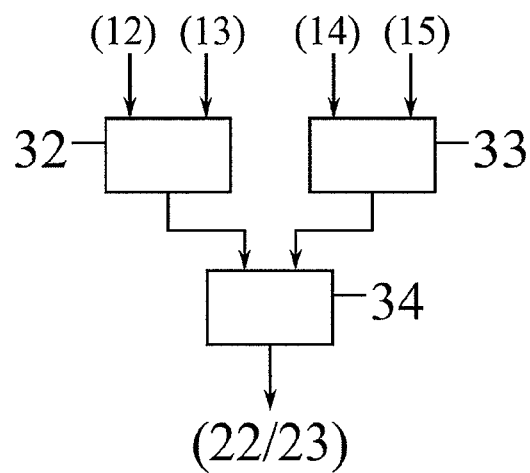
FIG. 3 shows a detailed diagram of an embodiment of the invention which is varied with regard to the coupling unit so as to couple the photon channels to a single photon diode.

Instead of such a 4/1 coupler unit 30, or 30', respectively, as shown in FIG. 2, it would, of course, also be possible to connect three 2/1 couplers 32, 33 and 34 in cascade, as shown in FIG. 3, such simple couplers being particularly common standard components and causing particularly low transmission losses.

Figure 4:
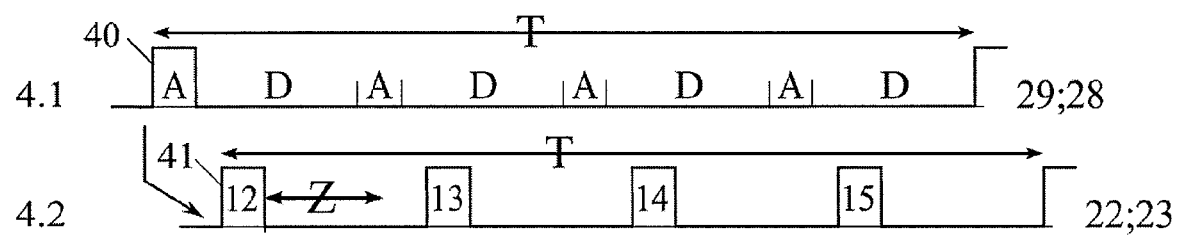
FIG. 4 shows a time diagram to illustrate the mode of operation of the present QKD arrangement.

Such (opto)coupler units, here generally denoted by 30 and 30', respectively, can be used in the present arrangement 21 without any problems, no matter whether they are provided as 4/1 couplers or as 2/1 couplers, since the transmitted signals (photons) all have the same frequency as well as a known polarization, wherein, furthermore, it is not disadvantageous if the polarization is rotated by the coupler, since the association to the respective photon channel happens due to the temporal occurrence of the photon—as has been mentioned and as will be explained in more detail by way of FIG. 4, so that, by way of this temporal association, also the respective original polarization of the photon upstream of the coupler units 30, 30'—even though at the location of the photodiodes 22, 23 it is, in fact, no longer determinable—can be detected.

At the remote subscriber (BOB in FIG. 1), also named receiver, the signal photons which are transmitted via the quantum channel 5 for reasons of precaution are also fed to the measuring unit 9 in a temporally controlled manner (cf. chopper 28). The chopper 28 may be designed similar to the chopper 29 in the photon source 2, and it is synchronized in a suitable way, as will be explained in more detail hereinafter. In this manner, it is not possible for an eavesdropper to falsify the arrival time of a signal photon at the remote subscriber station 7; by this, a so-called time displacement attack as would be conceivable for detectors in (space-division) multiplex operation (cf. FIG. 1), can be prevented. Otherwise, the photon measurement or analysis, respectively, is analogous to that on the local subscriber side 6, wherein also delay lines 24, 25, 26, 27 in the (at least three) photon channels are installed, and a coupler unit 30', in particular in the form of a 4/1 coupler component or in the form of three 2/1 coupler components 32, 33, 34 connected in cascades (cf. FIG. 3) are provided. Here, too, a single, simple photodiode replaces the four usual InGaAs detectors. With a view to the time window provided by the choppers, triggering of the remote measuring unit 9, as described in FIG. 1, is no longer required, and a simpler synchronization suffices here.

More in detail, a synchronization unit 35 is provided as the time controller 20 which may be constructed in a per se completely conventional manner so as to cause a synchronization of clock signals at the two subscriber stations 6, 7. For instance, both subscriber stations 6, 7 are each provided with a clock signal generator or clock signal oscillator 36 or 37, respectively, wherein these local oscillators are synchronized at the beginning of a QKD exchange. In operation, a synchronization procedure will then be started periodically so as to prevent a drift between the two clock signals which could drastically reduce the key generating rate.

In principle, a synchronization unit (35 in FIG. 2) is not necessarily needed because it suffices to update or adapt the oscillator 37 at the remote subscriber 7 in its frequency to the local oscillator 36 in the ALICE station 6 by re-adjusting the phase of the oscillator 37 for maximizing the total count rate at the remote measuring unit 9 (BOB subscriber). In order to achieve a particularly high security, a PLL (phase locked loop) circuit can be installed in the synchronization unit 35, and for these purposes a classical line between the two subscribers 6 and 7—as it is present as such—can be used.

A phase-locked loop is a sufficiently known stabilizing system for regulating phase and frequency of an oscillator such that it will match a reference signal. As has already been mentioned, this does not mean that the frequencies must be identical, much rather, also a difference in the frequencies might prevail such as a frequency multiplication or frequency division. The frequency matching is achieved by comparing the reference oscillator 36 (on the ALICE side 6) with the other oscillator 37 (on the BOB side 7) over several oscillations, thereby avoiding drifting apart of the clock signals and also preventing instantaneous attacks from being carried out at specific quantum signals, since the system does not react at the time basis of the local oscillator 37 of the remote station 7. Thus, it is not necessary either to authenticate the synchronization procedure.

The time control for the present QKD arrangement 21 shall be explained in more detail by way of FIG. 4. In FIG. 4, in line 4.1, a temporal cycle T is illustrated which is defined by two time intervals, i.e. the duration A of an active time slot and the duration D of an idle period between two such active detection time slots. Accordingly, the cycle time T is defined as general time window by T=4A+4D. During such a cycle time T, according to the first time line 4.1 in FIG. 4, in the photon source, the generation of a photon pair will be enabled only during an initial pulse 40, i.e. the pulse-wise generation of the photon pairs always occurs during a time interval A, whereupon during the residual period of the cycle time T, i.e. during 3A+4D, photons are not generated or emitted, respectively.

According to the second line 4.2 of FIG. 4, where the temporal control of the respective SPD photodiode 22, 23 is illustrated, in a comparative cycle time T a respective time slot 41 will result for the individual photon channels 12, 13, 14, 15, the time slots 41 being separated by idle periods D. By means of the delay units 24, 25, 26, 27, i.e. the different delay lines introducing differently long delay periods, the respective active window 40 of line 4.1 of FIG. 4 so-to-say is transformed to the four time slots 41 for the four photon channels, wherein in the respective individual case, one of these four time slots 41, depending on the polarization of the photon, will become active.

The duration of the time interval 40, i.e. the duration A, must be chosen such that, as a mean, from ALICE subscriber 6 per cycle, rather less than 1 photon will be detected. Furthermore, the period D may be chosen to be longer than the dead time Z of the detector photodiodes 22, 23 to thereby ensure a perfect functioning of these photodiodes 22, 23 in the respective "emergency", when receiving one photon. In the case of D>Z, the measuring units 8 and 9, respectively, in FIG. 2 are visibly comparable to the measuring units 8 and 9, respectively, in FIG. 1. These times, however, are known per se and in any event can also be ensured by a suitable selection of the interrupting units 29, 28 as well as by a corresponding selection of the delay periods of the delay units or lines, respectively, 24, 25, 26, 27. Since the average number of photons in a cycle will also depend on the laser output, it can always be assumed that A is substantially smaller than D, so that the cycle time T is substantially determined by 4D (T≈4D), so that by means of the delay units or lines, respectively, 24, 25, 26, 27, the delay times can be chosen to be approximately zero, D, 2D and 3D.

The idle period D is also important because the separation between two detection windows or time slots must be larger than the jitter of the respective detector in order that the detector time may clearly be associated to the respective path (photon channel) to thereby be able to determine the respective polarization. For most of the currently common silicon photodiodes 22, the idle period≈50 ns, and the jitter amounts to <500 ps. Accordingly, the following selection may be made for the individual parameters:

A=2.5 ns
D=80 ns

From this it results that T≈300 ns can be chosen, and that the maximum signal rate may be ≈3 MHz.

The length of the delay lines 24, 25, 26, 27 with a standard refraction index of ≈1.5 would then be approximately zero, or 15 m or 30 m or 45 m, respectively. With such lengths, the additional attenuation in the various photon channels of the optical module would be <0.3 dB.

In the remote subscriber station 7, the detector photodiode 23 is actuated with a corresponding time control according to the second line 4.2 in FIG. 4, wherein, as has been mentioned, no trigger mechanism is required, but merely a periodical synchronization of the local clock generator 37 so as to prevent drifting. Also in case of an InGaAs detector 23, the previously described time scheme is applicable.

Finally, in FIG. 2 evaluation units 42, 43 implemented as computers, such as PCs, microcomputers or the like, are illustrated which carry out the required measurement analyses and the temporal association of the passed-through photons to the photon channels 12, 13, 14, 15, so as to trigger corresponding steps, such as the generation of the quantum key.

What is claimed is:

1. A QKD (quantum key distribution) arrangement comprising:
a photon source for generating pairs of entangled idler photons and signal photons during use, wherein the photon source is adapted for a pulsed delivery of the pairs of photons;
two measuring units, the idler photons being fed to one of the two measuring units and the signal photons being fed to the other one of the two measuring units during use, each of the two measuring units comprising:
an optical module having several photon channels, a photon passing only one of the photon channels as a function of its polarization during use, wherein photon delay units with different pre-fixed delaying periods are comprised in the photon channels in the optical module; and
a detection device for detecting such a photon in association with its respective photon channel, wherein each detection device being one single photon detector and the respective passed-through photon being associated to its respective photon channel on the basis of a time pattern;
a first interrupting unit upstream of the other measuring unit for pulse-wise supplying the signal photons to the optical module during use; and
a time controller which adjusts the detection devices of the two measuring units with a view to the correlated detection of the photons of each such pair.

2. The QKD arrangement of claim 1, wherein one of the photon channels lacks the photon delay unit.

3. The QKD arrangement of claim 1, wherein the photon source comprises a pulsed laser.

4. The QKD arrangement of claim 1, further comprising a pump laser and an SPDC (spontaneous parametric down conversion) crystal, and a second optical interrupting unit provided for the photon source and arranged in a beam path between the pump laser and the SPDC crystal.

5. The QKD arrangement of claim 4, wherein the second optical interrupting unit is formed by a mechanical chopper.

6. The QKD arrangement of claim 1, wherein the first interrupting unit is formed by a mechanical chopper.

7. The QKD arrangement of claim 4, wherein the second, optical interrupting unit is formed by an electrooptical modulator.

8. The QKD arrangement of claim 1, wherein the first interrupting unit is formed by an electrooptical modulator.

9. The QKD arrangement of claim 1, wherein each single photon detector is formed by a single photodiode.

10. The QKD arrangement of claim 1, wherein each optical module includes a non-polarizing beam splitter and two polarizing beam splitters, the two polarizing beam splitters being arranged in two beam paths downstream of the non-polarizing beam splitter, a λ/2 platelet being interposed in only one of the two beam paths, the two polarizing beam splitters each having two outputs thereby defining four photon channels.

11. The QKD arrangement of claim 1, wherein the photon delay units are formed by delaying optical guides.

12. The QKD arrangement of claim 1, wherein each of the photon channels is connected with its associated single photon detector via an optical coupler unit.

13. The QKD arrangement of claim 1, wherein the time controller includes a synchronization unit.

14. The QKD arrangement of claim 13, wherein the time controller comprises clock signal units, and wherein the single photon detector of the one measuring unit and the photon source are connected to a first one of the clock signal units, and the single photon detector of the other measuring unit and the first interrupting unit are connected to a second one of the clock signal units, both clock signal units in turn being connected to the synchronization unit.

15. The QKD arrangement of claim 13, wherein the synchronization unit is configured with a phase-locked loop.

* * * * *